(12) United States Patent
Cheng et al.

(10) Patent No.: US 8,459,304 B2
(45) Date of Patent: Jun. 11, 2013

(54) AIR INTAKE MODULE OF WATER FEEDING APPARATUS

(75) Inventors: Meng-Feng Cheng, Taichung (TW); Zcw. Zhang, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 178 days.

(21) Appl. No.: 12/896,571

(22) Filed: Oct. 1, 2010

(65) Prior Publication Data

US 2012/0080097 A1    Apr. 5, 2012

(51) Int. Cl.
*B01F 5/04*    (2006.01)
(52) U.S. Cl.
USPC .......................................... 137/895; 137/860
(58) Field of Classification Search
USPC .................. 137/154, 205.5, 602, 603, 625.4,
137/843, 860, 888, 895; 222/145.1; 239/311,
239/318, 327, 571
See application file for complete search history.

(56) References Cited

U.S. PATENT DOCUMENTS

| | | | | |
|---|---|---|---|---|
| 3,473,736 A * | 10/1969 | Heitzman | ...................... | 239/101 |
| 3,646,974 A * | 3/1972 | Moore et al. | ................... | 141/392 |
| 4,199,949 A * | 4/1980 | Cadeddu | .......................... | 60/589 |
| 4,207,924 A * | 6/1980 | Peters | ...................... | 137/625.66 |
| 4,320,541 A * | 3/1982 | Neenan | .............................. | 4/492 |
| 4,817,825 A * | 4/1989 | Freese | ......................... | 222/129.2 |
| 5,678,592 A * | 10/1997 | Boticki et al. | ................. | 137/216 |
| 5,758,691 A * | 6/1998 | Nedderman, Jr. | .............. | 137/895 |
| 5,881,756 A * | 3/1999 | Abbasi et al. | ...................... | 137/9 |
| 6,027,044 A * | 2/2000 | Hirata | ......................... | 239/428.5 |
| 6,776,901 B1* | 8/2004 | Vaughan et al. | ............... | 210/190 |
| 7,043,775 B2* | 5/2006 | Holtsnider et al. | ............ | 4/541.6 |
| 7,416,171 B2* | 8/2008 | Brice | .............................. | 261/76 |
| 7,543,599 B2* | 6/2009 | Cover | ........................... | 137/218 |
| 7,648,350 B2* | 1/2010 | Hinz et al. | ..................... | 417/570 |
| 2004/0050438 A1* | 3/2004 | Haas | .............................. | 137/888 |
| 2005/0173336 A1* | 8/2005 | Arnaud | ........................ | 210/512.1 |
| 2006/0070675 A1* | 4/2006 | Hsu | .................................. | 137/888 |
| 2006/0118172 A1* | 6/2006 | Wu | ................................. | 137/217 |
| 2007/0204392 A1* | 9/2007 | Lo | ...................................... | 4/354 |
| 2010/0314468 A1* | 12/2010 | Han | ................................. | 239/311 |
| 2011/0139284 A1* | 6/2011 | Dyer | ............................. | 137/892 |

\* cited by examiner

*Primary Examiner* — Craig Schneider
*Assistant Examiner* — Jessica Cahill

(57) ABSTRACT

An air intake module of a water feeding apparatus is provided, which includes a body and a valve, and the body includes a water inlet channel and a water outlet channel. An air intake hole runs through the body outward from a joint between the water inlet channel and the water outlet channel, and the valve is disposed at the joint. With the change of a cross-sectional area of the joint, a phenomenon of a high flow rate and a low pressure occurs to force the valve plate open, and air is sucked in mixed with the water flow. When a back pressure of the water flow is larger than an atmospheric pressure outside, the valve plate is forced to close the air intake hole, so as to avoid leakage of the water flow and prevent the air intake hole from being clogged by impurities.

11 Claims, 4 Drawing Sheets

AIR INTAKE MODULE OF WATER FEEDING APPARATUS

BACKGROUND OF THE INVENTION

1. Field of Invention

The present invention relates to a water saving technology of a water feeding apparatus, and more particularly to an air intake module of a water feeding apparatus capable of saving water, increasing pressure, and preventing back pressure leakage and clogging.

2. Related Art

Conventional shower heads are usually provided for users to take a shower, and some of shower heads are provided with a water flow switching mechanism, thereby changing the intensity of the water flow and the size of water splashes from the shower heads, and even producing a massaging effect in use by producing a rushing water flow through the design of intermittent water supply.

However, with global warming and climate changes, water resources become more and more precious, and many countries enacts regulations for water use mostly in the environmental protection spirit of reducing water consumption to save water. Thus, manufacturers of water feeding apparatuses are all devoted to creating low-flow and high-pressure water feeding apparatuses, so as to design a water feeding apparatus that reduces water consumption to save cost without affecting users' feeling of taking a shower.

A structure is disclosed in U.S. Pat. No. 7,416,171, entitled "VACUUM VENTURI APPARATUS AND METHOD", in which first and second openings are disposed in a plug and the second opening is connected to the first opening, a diameter of the second opening is larger than that of the first opening, a third opening is disposed radially outward from the first opening, the first opening is connected to a water inlet end, the diameter of the first opening is smaller than that of the water inlet end, and the second opening is connected to a water outlet end. With the differences between the diameters of the water inlet end, the first opening, and the second opening, a Venturi Effect occurs when a water flow passes through the first opening, so as to draw air from the third opening, and the water flow is mixed with the air, thereby raising the water output pressure and reducing water consumption, so as to achieve the efficacy of water saving.

The use of the above vacuum venturi apparatus alone may not cause any problem. However, a current water feeding apparatus (for example, a shower head) is usually provided with a water flow switching mechanism in a front part, and when a user switches the water flow switching mechanism in use, a back pressure of a water flow is produced inside the shower head, which increases the pressure of the water flow inside the shower head, and thus causes the problem that the water flow is ejected from the third opening of the vacuum venturi apparatus.

Furthermore, when impurities such as water scale exist in the shower head, the back water flow may push the impurities such as the water scale to the third opening, which clogs the third opening, so the vacuum venturi apparatus loses efficacy.

SUMMARY OF THE INVENTION

The invention is directed to an air intake module of a water feeding apparatus, in which by disposing a valve at a joint between an air intake hole, a water inlet channel, and a water outlet channel of a body, a valve plate of the valve can open when the water feeding apparatus supplies water and can close the air intake hole in a back pressure state, so as to achieve the efficacy of saving water, increasing pressure, and preventing back pressure leakage and clogging.

The invention is further directed to an air intake module of a water feeding apparatus, in which the valve is made of soft rubber or silica gel, so that the valve plate can slightly change with variation of a pressure difference, so as to reduce a noise generated when air is sucked in through the air intake hole, thus achieving the efficacy of improving the use comfort.

In order to achieve the above objectives, the invention provides an air intake module of a water feeding apparatus, which comprises a body and a valve. The body has a water inlet channel, a water outlet channel, and at least one air intake hole running through each other. The water inlet channel and the water outlet channel run through each other axially, a joint between the water inlet channel and the water outlet channel has the smallest cross-section in the water inlet channel and the water outlet channel, and the air intake hole runs through the body outward from the joint between the water inlet channel and the water outlet channel. The valve is disposed at the joint between the water inlet channel and the water outlet channel, the valve has a valve plate, and the valve plate has flexibility to open when the water feeding apparatus supplies water and close the air intake hole in a back pressure state.

Since the cross-section of the water inlet channel is larger than that of the water outlet channel, and the air intake hole runs through the body outward from the joint between the water inlet channel and the water outlet channel, when a water flow passes through the joint between the water inlet channel and the water outlet channel, a phenomenon of a high flow rate and a low pressure occurs due to the change of a cross-sectional area, so that the valve plate of the valve is forced open by an outside atmospheric pressure, and outside air is sucked in through the air intake hole and mixed with the water flow, thus achieving the efficacy of saving water and increasing pressure; and when the pressure of the water flow is larger than the outside atmospheric pressure, the valve plate is forced to close the air intake hole, so as to avoid reflux and leakage of the water flow from the air intake hole, and prevent impurities such as water scale from entering the air intake hole to avoid the problem that the air intake hole is clogged.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
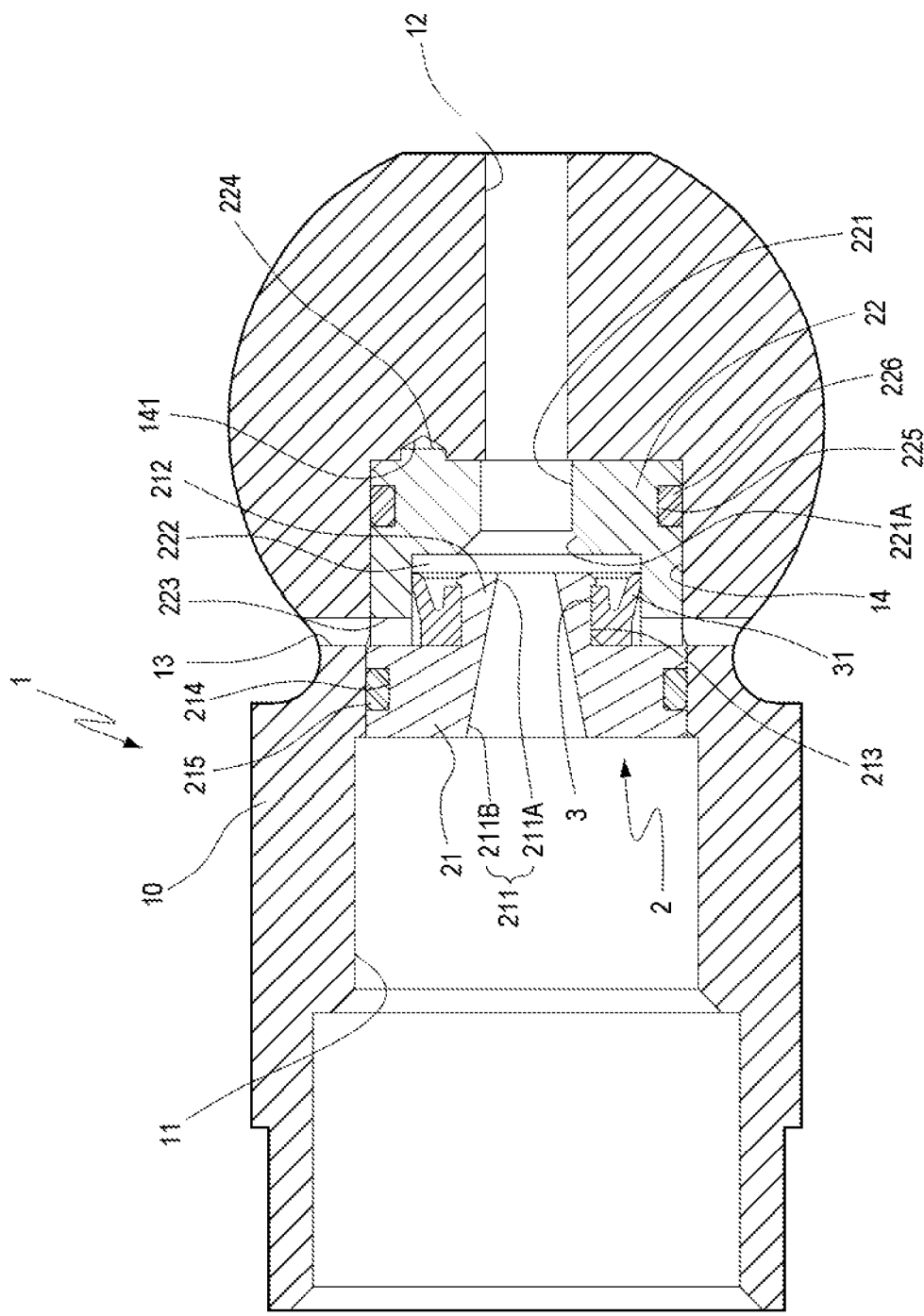
FIG. 1 is a schematic cross-sectional structural view of an air intake module according to a first embodiment of the invention.
Figure 2:
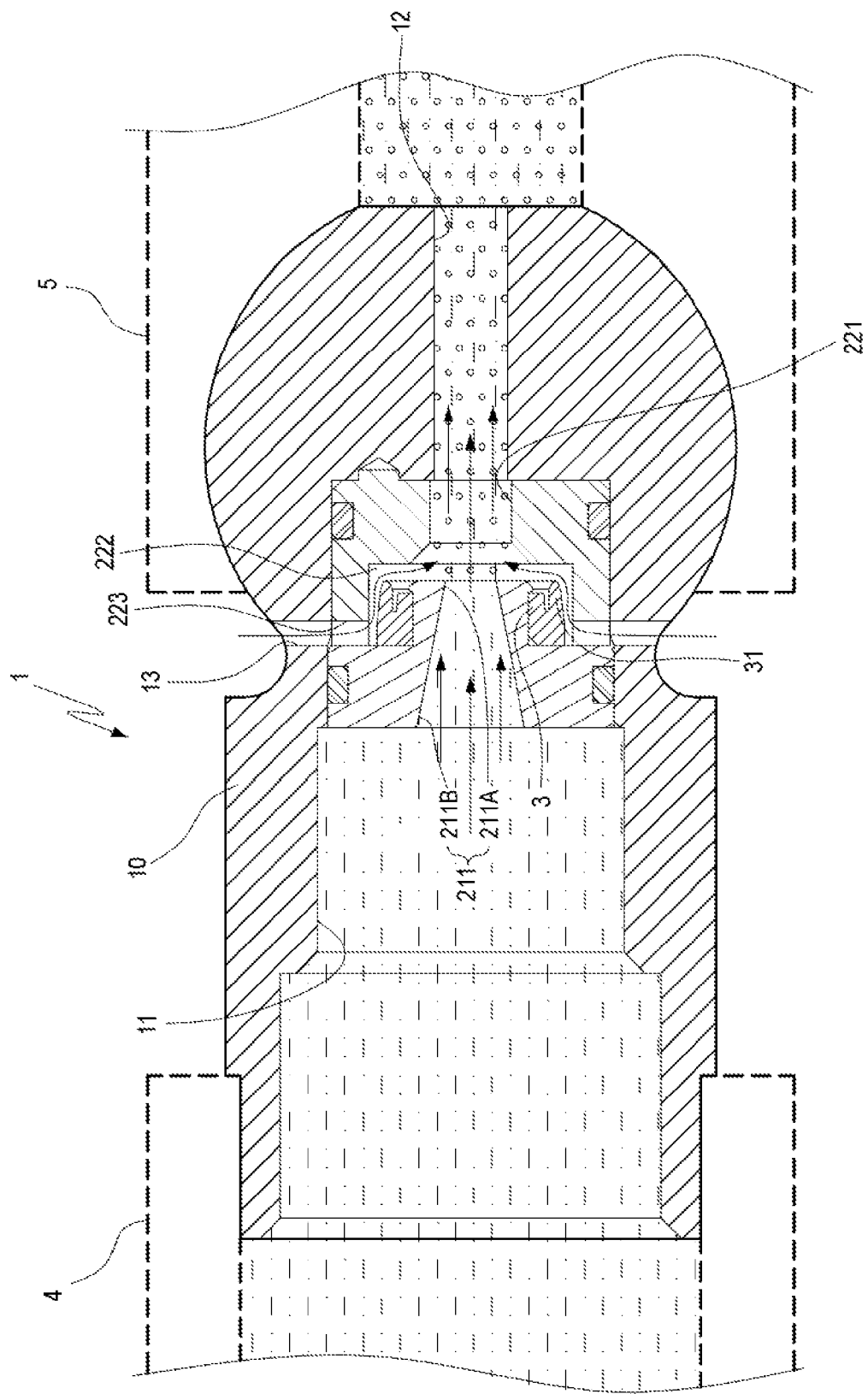
FIG. 2 is a schematic cross-sectional structural view of the air intake module in an air intake state according to the invention.
Figure 3:
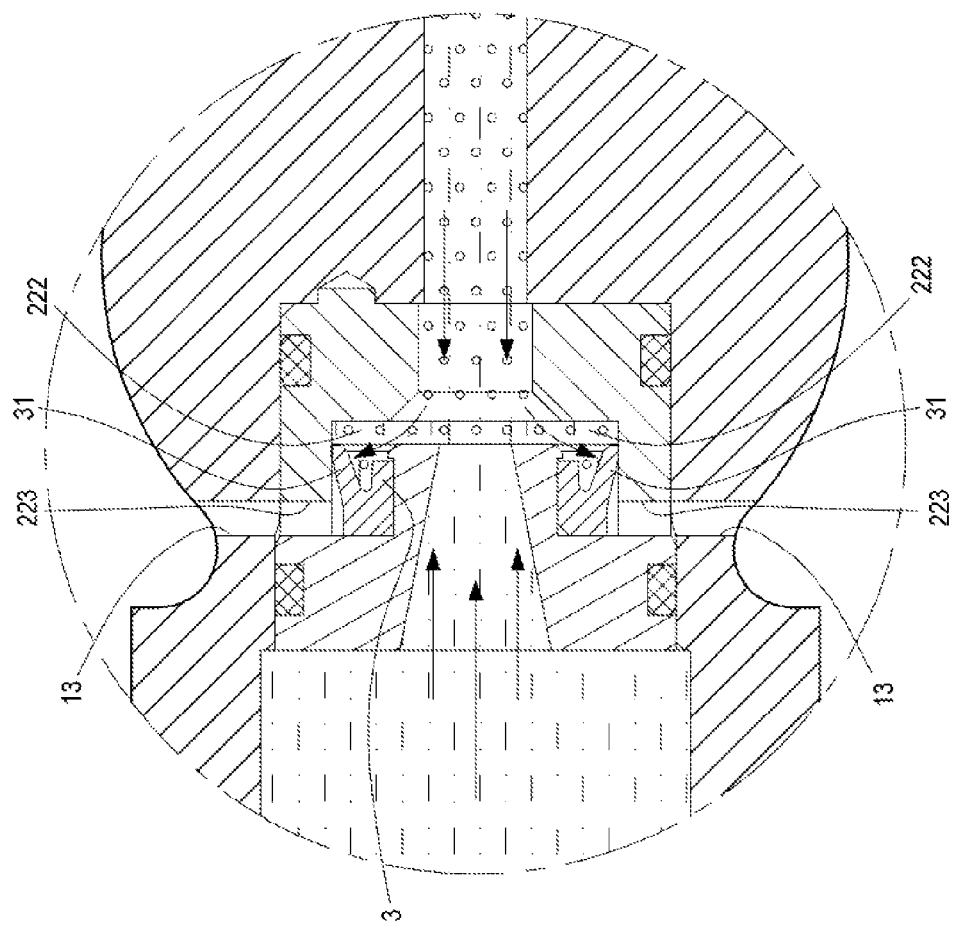
FIG. 3 is a schematic cross-sectional structural view of the air intake module in a back pressure state with a valve plate closed according to the invention.

First, FIGS. 1 to 3 are structural views of preferred embodiments of the invention. FIG. 1 is a schematic cross-sectional structural view of an air intake module according to the invention. FIG. 2 is a schematic cross-sectional structural view of the air intake module in an air intake state according to the invention. FIG. 3 is a schematic cross-sectional structural view of the air intake module in a back pressure state with a valve plate closed according to the invention.

An air intake module 1 according to the invention may be mounted on a water feeding apparatus such as a shower head and a handheld shower head. The air intake module 1 includes a body 10, a plug 2, and a valve 3. The body 10 has a water inlet channel 11, a water outlet channel 12, and at least one air intake hole 13 running through each other. The water inlet channel 11 and the water outlet channel 12 run through the body 10 axially, a joint between the water inlet channel 11 and the water outlet channel 12 has the smallest cross-section in the water inlet channel 11 and the water outlet channel 12, and the air intake hole 13 runs through the body 10 outward from the joint between the water inlet channel 11 and the water outlet channel 12.

In this embodiment, the body 10 is provided with four equally spaced air intake holes 13, and each air intake hole 13 extends radially and runs through the body 10 outward from the joint between the water inlet channel 11 and the water outlet channel 12.

The body 10 has an accommodating portion 14 at the joint between the water inlet channel 11 and the water outlet channel 12. The plug 2 is disposed in the accommodating portion 14, and is formed of a first plug 21 and a second plug 22. The first plug 21 is adjacent to the water inlet channel 11, and has a first opening 211 corresponding to the water inlet channel 11, while the second plug 22 is adjacent to the water outlet channel 12, and has a second opening 221 corresponding to the water outlet channel 12. Further, the second plug 22 has an air intake chamber 222 at an end adjacent to the first plug 21, and the air intake chamber 222 is in communication with the first opening 211 and the second opening 221. The first opening 211 has, for example, a cone shape, and has a small-diameter end 211A at an end adjacent to the air intake chamber 222 and the second opening 221, and a large-diameter end 211B is formed at an end of the first opening 211 opposite to the small-diameter end 211A. The large-diameter end 211B is in communication with the water inlet channel 11, a diameter of the small-diameter end 211A is smaller than that of the second opening 221, so that the joint between the water inlet channel 11 and the water outlet channel 12 has the smallest cross-section in the water inlet channel 11 and the water outlet channel 12, and the second opening 221 has a conical portion 221A at an end adjacent to the small-diameter end 211A of the first opening 211.

The second plug 22 has a third opening 223 respectively corresponding to each air intake hole 13, and each third opening 223 passes through the second plug 22 and is in communication with the air intake chamber 222 through the air intake hole 13.

The first plug 21 has a convex portion 212 corresponding to the air intake chamber 222, the convex portion 212 has a groove 213 for embedding the valve 3, and the valve 3 is made of flexible material (for example, rubber or silica gel). In this embodiment, the air intake chamber 222, the convex portion 212, and the groove 213 may be all circular but is not limited to, while the valve 3 is, for example, annular, and the valve 3 has an annular valve plate 31 extending obliquely from an outer rim thereof, so that a cross-section of the valve 3 slightly has a V shape, and the valve plate 31 can expand outward due to flexibility of the material and press against the air intake chamber 222 to close the third openings 223 and the air intake holes 13, or the valve plate 31 expands inward so that the air intake chamber 222 is in communication with the third openings 223 and the air intake holes 13.

The accommodating portion 14 of the body 10 has a recess 141, and the second plug 22 has a clamping block 224 corresponding to the recess 141, so that when the second plug 22 is disposed in the accommodating portion 14, the clamping block 224 is embedded in the recess 141 for positioning the second plug 22.

In addition, in order to maintain air-tightness between the plug 2 and the accommodating portion 14, the first plug 21 has a first annular groove 214 on an outer rim, and a first O-ring 215 is embedded in the first annular groove 214, so as to maintain air-tightness between the first plug 21 and the accommodating portion 14, and the second plug 22 has a second annular groove 225 on an outer rim, and a second O-ring 226 is embedded in the second annular groove 225, so as to maintain air-tightness between the second plug 22 and the accommodating portion 14.

FIG. 2 is a schematic cross-sectional structural view of the air intake module in an air intake state according to the invention. When the air intake module 1 according to the invention is mounted on a water feeding apparatus in the form of a shower head, an end of the body 10 having the water inlet channel 11 may be connected to a water inlet pipe 4 (represented only by a dashed line in the figure), and an end of the body 10 having the water outlet channel 12 may be connected to the shower head 5 (represented only by a dashed line in FIG. 2).

When water supply is turned on, a water flow enters the water inlet channel 11 through the water inlet pipe 4, passes through the large-diameter end 211B of the first opening 211 and then the small-diameter end 211A of the first opening 211, then passes through the air intake chamber 222 and the second opening 221, and finally is output to the shower head 5 through the water outlet channel 12. Since the small-diameter end 211A of the first opening 211 is the part having the smallest diameter and cross-section in the water flow path, based on the Venturi tube principle, when the water flow passes through the small-diameter end 211A, the phenomenon of a high flow rate and a low pressure occurs due to the change of the cross-sectional area. Thus, the air intake chamber 222 forms a low-pressure region, and when an atmospheric pressure outside the body 10 is larger than a pressure of the air intake chamber 222, the outside atmospheric pressure forces the valve plate 31 of the valve 3 to open inward, that is, in the state as shown in FIG. 2, which causes outside air to enter the air intake chamber 222 through the air intake holes 13 and the third openings 223 to be mixed with the water flow, so as to increase the water output pressure and reduce water flow, thus achieving the efficacy of saving water. According to the result of practical measurement of the inventor, averagely 10% of water can be saved by using the air intake module according to the present invention.

Next, FIG. 3 is a schematic cross-sectional structural view of the air intake module in a back pressure state with the valve plate closed. When a user switches a water flow in the use of the shower head, a back pressure of the water flow is generated inside the shower head, and when the back pressure transfers back to the air intake chamber 222 in an opposite direction, the back pressure pushes the valve plate 31 of the valve 3 outward, so that the valve plate 31 presses against the air intake chamber 222 to close a path from the air intake chamber 222 to each of the third openings 223, so that the third openings 223 and the air intake holes 13 are all closed, and the water flow will not be ejected from the air intake holes 13, thereby avoiding the problem of back pressure leakage.

Furthermore, the design in which the valve plate 31 automatically closes the path from the air intake chamber 222 to each of the third openings 223 during the back pressure can also prevent impurities such as water scale from entering the third openings or the air intake holes, so as to prevent the problem of clogging.

In addition, when the valve uses soft rubber or silica gel, the extent to which the valve plate is opened inward slightly changes with a pressure difference between the pressure of the air intake chamber and the atmospheric pressure, so as to reduce the noise generated when air is sucked in through the air intake hole, thus achieving the efficacy of improving the use comfort.

Figure 4:
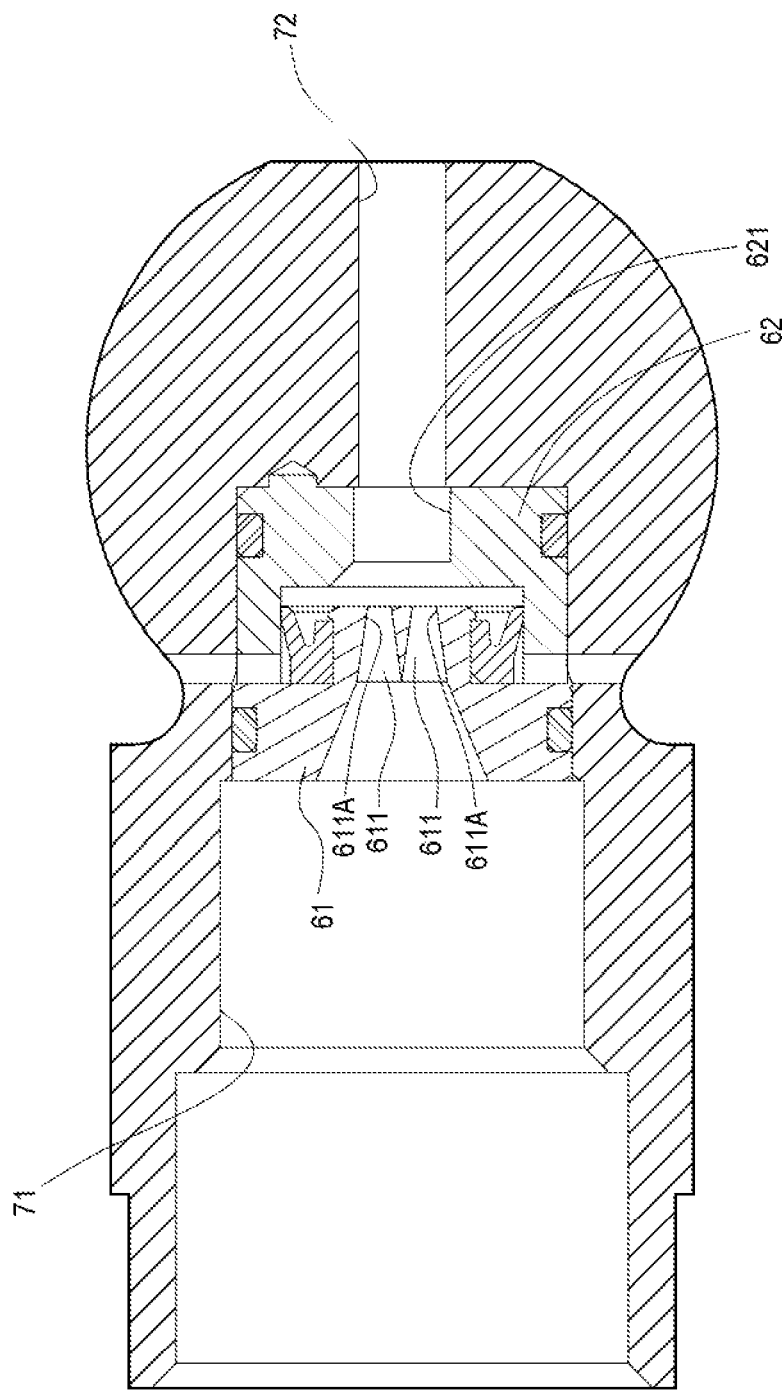
FIG. 4 is a schematic cross-sectional structural view of an air intake module according to a second embodiment of the invention.

Finally, FIG. 4 is a schematic cross-sectional structural view according to a second embodiment of the invention. The first plug 61 has a plurality of first openings 611 corresponding to the water inlet channel 71, and a sum of areas of small-diameter ends 611A of the first openings 611 adjacent to the second plug 62 is smaller than that of second openings 621 of the second plug 62, so that a joint between the water inlet channel 71 and the water outlet channel 72 has the smallest cross-section in the water inlet channel 71 and the water outlet channel 72, which can also achieve the same efficacy as that in the first embodiment.

Of course, in addition to being assembled to a water inlet pipe and a shower head, the air intake module according to the invention can also be directly assembled inside a water feeding apparatus such as a shower head, and the same efficacy as that in the first embodiment is achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air intake module of a water feeding apparatus, comprising:
   a body, having a water inlet channel, a water outlet channel, an accommodation portion between the water inlet channel and the water outlet channel, and an air intake hole, wherein the water inlet channel and the water outlet channel run axially;
   a first plug, positioned within the accommodation portion, with a first plug opening, wherein the first plug opening has a large opening end and a small opening end, and the large opening end connects to the water inlet channel;
   a second plug, positioned within the accommodation portion, with a second plug opening, a third plug opening, a conical portion, and an air intake chamber, wherein the second plug is adjacent to the first plug, the second plug opening is corresponding to the small opening end of the first plug opening, and the third plug opening is corresponding to the air intake hole, the air intake chamber is connected to a joint between the small opening end and the second opening, and the third plug opening connects to the air intake hole and the air intake chamber;
   a valve, disposed in the third plug opening, including a first protruding portion and a second protruding portion, wherein the first protruding portion, functioning as a valve plate, is opened when the water feeding apparatus supplies water and, is closed when the air intake hole in a back pressure state;
   wherein the small opening end has a smallest cross-section comparing to the second opening, the water inlet channel, and the water outlet channel, the accommodating portion has a cone recess, and the second plug has a clamping block corresponding to the cone recess, so that when the second plug is disposed in the accommodating portion, the clamping block is embedded in the cone recess.

2. The air intake module of the water feeding apparatus according to claim 1, wherein the first plug opening is in a cone shape.

3. The air intake module of the water feeding apparatus according to claim 1, wherein the second plug opening has a conical portion adjacent to the small opening end of the first plug opening.

4. The air intake module of the water feeding apparatus according to claim 1, wherein the first plug has a first annular groove on an outer rim thereof, and a first O-ring is embedded in the first annular groove to maintain air-tightness between the first plug and the accommodating portion, and the second plug has a second annular groove on an outer rim thereof, and a second O-ring is embedded in the second annular groove to maintain air-tightness between the second plug and the accommodating portion.

5. The air intake module of the water feeding apparatus according to claim 1, wherein the second plug opening has a conical portion adjacent to the air intake chamber.

6. The air intake module of the water feeding apparatus according to claim 1, wherein the valve plate is formed by extending obliquely from the valve, so that a cross-section of the valve has a V-shape.

7. The air intake module of the water feeding apparatus according to claim 1, wherein the first plug has a plurality of first plug openings corresponding to the water inlet channel, the second plug has a plurality of second plug openings, and a sum of areas of small opening ends of the first plug openings adjacent to the second plug is smaller than the second plug openings of the second plug, so that the joint has the smallest cross-section in the water inlet channel and the water outlet channel.

8. The air intake module of the water feeding apparatus according to claim 1, wherein the valve is made of elastic material.

9. The air intake module of the water feeding apparatus according to claim 8, wherein the elastic material is rubber or silica gel.

10. The air intake module of the water feeding apparatus according to claim 1, wherein the body is provided with a plurality of spaced air intake holes, and each of the air intake holes extends radially and runs through the body outward from the joint.

11. The air intake module of the water feeding apparatus according to claim 10, wherein the valve and the valve plate are both annular and capable of closing the air intake holes simultaneously.

* * * * *